(12) United States Patent
White et al.

(10) Patent No.: US 12,510,036 B2
(45) Date of Patent: Dec. 30, 2025

(54) EXHAUST GAS RECIRCULATION AND AFTERTREATMENT CONTROL

(71) Applicant: Perkins Engines Company Limited, Peterborough (GB)

(72) Inventors: Anthony James Vaughan White, March (GB); Elif Ozmen Sungur, Market Harborough (GB); Antony James Eager, Peterborough (GB)

(73) Assignee: Perkins Engines Company Limited, Peterborough (GB)

( * ) Notice: Subject to any disclaimer, the term of this patent is extended or adjusted under 35 U.S.C. 154(b) by 0 days.

(21) Appl. No.: 18/624,282

(22) Filed: Apr. 2, 2024

(65) Prior Publication Data

US 2024/0360799 A1    Oct. 31, 2024

(30) Foreign Application Priority Data

Apr. 28, 2023    (GB) ...................................... 2306297

(51) Int. Cl.
*F02D 41/00* (2006.01)
*F01N 3/035* (2006.01)
(Continued)

(52) U.S. Cl.
CPC ......... *F02D 41/0077* (2013.01); *F01N 3/035* (2013.01); *F02D 41/0072* (2013.01);
(Continued)

(58) Field of Classification Search
CPC ..................... F02D 41/0077; F02D 2200/0812
See application file for complete search history.

(56) References Cited

U.S. PATENT DOCUMENTS

| 6,378,515 B1 | 4/2002 | Geyer |
| 8,387,593 B2 | 3/2013 | Ichihara et al. |

(Continued)

FOREIGN PATENT DOCUMENTS

| DE | 102010023659 A1 | 12/2011 |
| DE | 102013214028 B4 | 11/2021 |

(Continued)

OTHER PUBLICATIONS

European Extended Search Report for Int'l. Patent Appln. No. 24167708.7, mailed Oct. 16, 2024 (9 pgs).

(Continued)

*Primary Examiner* — Laert Dounis (57) ABSTRACT

An engine assembly comprises an exhaust gas recirculation circuit, an aftertreatment apparatus and a controller. The controller is configured to determine a desired proportion of exhaust gas to be directed to the exhaust gas recirculation circuit. The controller is further configured to determine, based on the proportion of exhaust gas to be directed to the exhaust gas recirculation circuit, a baseline value for an extent to which to open the exhaust gas recirculation valve for a clean aftertreatment apparatus. The controller is further configured to determine a compensation function based on an inferred aftertreatment flow restriction value. The controller is further configured to control the extent to which the exhaust gas recirculation valve is open based on the baseline value modified by the compensation function in order to maintain the desired proportion of exhaust gas to be directed to the exhaust gas recirculation circuit.

14 Claims, 6 Drawing Sheets

(51) Int. Cl.
    *F02D 21/08*     (2006.01)
    *F02D 41/02*     (2006.01)
    *F02D 41/14*     (2006.01)
    *F02D 41/24*     (2006.01)
    *F02M 26/00*     (2016.01)
    *F02M 26/05*     (2016.01)
    *F02M 26/15*     (2016.01)
    *F02M 26/16*     (2016.01)
    *F02M 26/47*     (2016.01)

(52) U.S. Cl.
    CPC ....... *F02D 41/145* (2013.01); *F02D 41/1467* (2013.01); *F02D 41/2422* (2013.01); *F02M 26/00* (2016.02); *F02M 26/05* (2016.02); *F02M 26/15* (2016.02); *F02M 26/16* (2016.02); *F02M 26/47* (2016.02); *F02D 2021/083* (2013.01); *F02D 41/029* (2013.01); *F02D 2200/0812* (2013.01); *F02M 2026/001* (2016.02)

(56) References Cited

U.S. PATENT DOCUMENTS

| | | |
|---|---|---|
| 9,458,785 B2 | 10/2016 | Ichihara et al. |
| 9,976,521 B1 | 5/2018 | Jentz et al. |
| 11,067,041 B2 | 7/2021 | Arakawa et al. |
| 11,459,965 B2 | 10/2022 | Srinivasan et al. |
| 11,560,823 B2 | 1/2023 | Dudar |
| 2014/0130495 A1* | 5/2014 | Pott ..................... F02D 41/0065 123/568.11 |
| 2016/0146135 A1 | 5/2016 | Goodall et al. |
| 2019/0120154 A1* | 4/2019 | Teraya .................... F01N 3/021 |
| 2021/0071603 A1* | 3/2021 | Tsuyuki ............... F02M 26/15 |
| 2021/0348572 A1* | 11/2021 | Sato ...................... F02D 41/024 |
| 2022/0205405 A1 | 6/2022 | Williams et al. |

FOREIGN PATENT DOCUMENTS

| | | | |
|---|---|---|---|
| EP | 3093482 A1 | 11/2016 | |
| FR | 2915529 A1 | 10/2008 | |
| GB | 2586864 A | 3/2021 | |
| JP | 2009225017 A | * 10/2009 | |
| WO | 2008131789 A1 | 11/2008 | |
| WO | WO-2011049137 A1 | * 4/2011 | ............ B01D 46/66 |

OTHER PUBLICATIONS

Great Britain Search Report related to Application No. 2306297.9; reported on Oct. 20, 2023.

* cited by examiner

EXHAUST GAS RECIRCULATION AND AFTERTREATMENT CONTROL

CROSS-REFERENCE TO RELATED APPLICATION

This application claims priority under 35 USC § 119 and the Paris Convention to Great Britain Patent Application No. 2306297.9 filed on Apr. 28, 2023.

TECHNICAL FIELD

The disclosure relates to the field of internal combustion engines and, in particular, to internal combustion engines having an exhaust gas recirculation circuit and an aftertreatment apparatus in which an increasing gas flow restriction may evolve with use.

BACKGROUND

In an engine with an exhaust gas recirculation circuit and an aftertreatment apparatus, exhaust leaving the engine takes either a path to the exhaust gas recirculation circuit or a path to the aftertreatment apparatus. A proportion of exhaust flowing into the path of the exhaust gas recirculation circuit may be controlled by an exhaust gas recirculation valve, with the remainder of exhaust gas flowing into the path leading to the aftertreatment apparatus.

With use, the aftertreatment apparatus (e.g. comprising a diesel particulate filter) may become increasingly filled with deposits of soot and/or ash. Such deposits may become increasingly difficult to remove using standard aftertreatment cleaning cycles. As an aftertreatment apparatus is filled with deposits, restriction of flow of exhaust gas in the aftertreatment system increases.

In circumstances where the resistance to exhaust flow in the aftertreatment apparatus increases, this may limit the proportion of exhaust flowing through the aftertreatment apparatus and thereby divert a larger than intended proportion of exhaust into the exhaust gas recirculation circuit. This may lead to less oxygen availability in the combustion chamber of the engine, which may lead to increased generation of soot. Increased soot may in turn lead to increased soot deposits in the aftertreatment apparatus. In this way, a self-reinforcing feedback loop results in ever increasing soot generation leading to a situation ultimately where the aftertreatment apparatus may perform in such a way as to result in an unacceptable level of impact on the customer, and may require replacement.

SUMMARY OF THE DISCLOSURE

Against this background there is provided an engine assembly comprising:

An internal combustion engine having: a combustion chamber with a combustion chamber inlet for supplying air to the combustion chamber and a combustion chamber outlet for releasing exhaust gas from the combustion chamber;
  an exhaust channel arrangement configured to receive exhaust from the combustion chamber outlet and to supply exhaust to a first exhaust channel and a second exhaust channel;
  an aftertreatment apparatus configured to receive exhaust from the first exhaust channel;
  an exhaust gas recirculation circuit configured to receive exhaust gas from the second exhaust channel and to supply exhaust gas to the combustion chamber inlet for supplying recirculated exhaust gas to the combustion chamber, wherein the exhaust gas recirculation circuit comprises an exhaust gas recirculation valve for regulating flow of exhaust through the exhaust gas recirculation circuit; and
a controller configured:
  to determine a desired proportion of exhaust gas to be directed to the exhaust gas recirculation circuit;
  to determine, based on the proportion of exhaust gas to be directed to the exhaust gas recirculation circuit, a baseline value for an extent to which to open the exhaust gas recirculation valve for a clean aftertreatment apparatus;
  to determine a compensation function based on an inferred aftertreatment flow restriction value; and
  to control an extent to which the exhaust gas recirculation valve is open based on the baseline value modified by the compensation function in order to maintain the desired proportion of exhaust gas to be directed to the exhaust gas recirculation circuit.

In this way, for a particular exhaust gas recirculation valve position, mass flow distribution between the exhaust gas that enters the aftertreatment apparatus and the exhaust gas that enters the exhaust gas recirculation circuit may be maintained more consistently through the life of the aftertreatment system.

DETAILED DESCRIPTION

Figure 1:
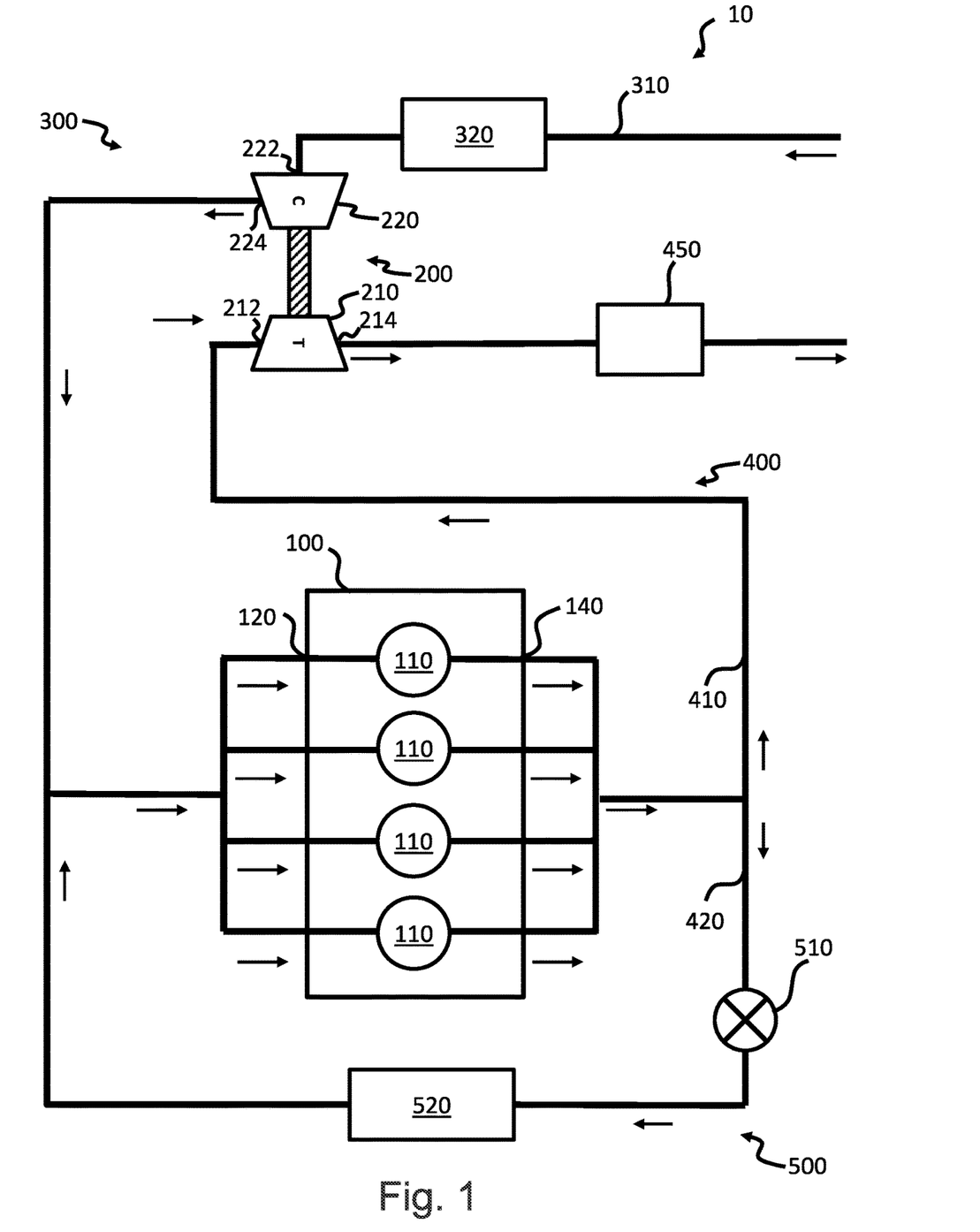
FIG. 1 shows an engine assembly in accordance with the present disclosure.

A schematic diagram of an engine assembly in accordance with the disclosure is shown in FIG. 1.

The engine assembly 10 comprises an internal combustion engine 100, a turbocharger system 200, an air supply circuit 300, an exhaust circuit 400 and an exhaust gas recirculation circuit 500.

The internal combustion engine 100 may comprise a combustion chamber 110, a combustion chamber inlet 120 for supplying air to the combustion chamber, a fuel injector (not shown) for injecting fuel into the combustion chamber, a combustion chamber outlet 140 for releasing exhaust gas from the combustion chamber and a rotatable drive shaft (not shown). As is well known in the art, combustion of fuel in air within the combustion chamber 110 results in rotation of the drive shaft. The combustion chamber 110 may comprise one or more pistons (not shown) each of which may be associated with one or more fuel injectors and each of which may have one or more combustion chamber inlets 120 and one or more combustion chamber outlets 140. Again, the specific configuration of combustion chamber inlet 120, combustion chamber outlet 140 and fuel injectors may be as known in the art. In arrangements having a plurality of combustion chambers, the combustion chamber inlet may divide into a plurality of branches each configured to supply one combustion chamber. Similarly, in arrangements having a plurality of combustion chambers, a single combustion chamber outlet may be fed by a plurality of branches each configured to receive exhaust from one of the plurality of combustion chambers.

The engine assembly 10 comprises an exhaust channel arrangement configured to receive exhaust from the combustion chamber outlet 140 and to supply exhaust to a first exhaust channel 410 and a second exhaust channel 420.

The turbocharger system 200 comprises a turbine 210 and a compressor 220. The turbine 210 comprises a turbine inlet 212 by which gas may enter the turbine 210 and a turbine outlet 214 by which gas may exit the turbine 210. The turbine inlet 212 receives exhaust gas from the first exhaust channel 410. Gas passing through the turbine 210 between the turbine inlet 212 and the turbine outlet 214 may cause the turbine 210 to rotate. A mechanical connection between the turbine 210 and the compressor 220 enables rotational kinetic energy in the turbine 210 to be transferred to the compressor 220 in order to compress gas in the compressor 220.

The compressor 220 comprises a compressor inlet 222 by which air may enter the compressor 220 and a compressor outlet 224 by which compressed air may leave the compressor 220.

In this way, in operation, the turbocharger system 200 may be used to recover energy from exhaust gas released by the internal combustion engine 100 and use that energy to compress air upstream of the internal combustion engine 100 in order to enable more fuel to be burned given the increased amount of air available by virtue of the compression. In this way, engine output and efficiency may be increased.

In alternative embodiments, not illustrated, the turbocharger system 200 may comprise a plurality of turbochargers, each comprising a compressor and a turbine, and may be configured such that air flows through the compressor of each turbocharger in turn.

The air supply circuit 300 comprises an air inlet 310 for receiving air, an air filter 320 for filtering the air from the air inlet and for supplying filtered air to the compressor inlet 222. Downstream of the compressor 220, the air supply circuit 300 continues to the one or more combustion chamber inlets 120 of the internal combustion engine 100.

The exhaust circuit 400 comprises the first exhaust channel 410 that directs exhaust gas from the combustion chamber outlet 140 of the internal combustion engine 100 to the turbine inlet 212 to enable energy recovery within the turbine 210. The turbine 210 comprises a turbine outlet 214. Downstream of the turbine outlet 214, the exhaust circuit 400 comprises an aftertreatment apparatus 450.

The exhaust circuit 400 further comprises the second exhaust channel 420 that supplies exhaust gas to the exhaust recirculation circuit 500.

The exhaust gas recirculation circuit 500 extends between the second exhaust channel 420 and the combustion chamber inlet 120 of the internal combustion engine 100. In this way, the exhaust gas recirculation circuit 500 facilitates recirculation of exhaust gas from the combustion chamber 110 back into the combustion chamber 110 for a further combustion cycle.

The exhaust gas recirculation circuit 500 comprises an EGR valve 510 and an EGR cooler 520.

The EGR valve 510 may be used to regulate exhaust flow into the exhaust gas recirculation circuit 500 via the second exhaust channel 420. For example, when the EGR valve 510 is fully closed, all exhaust leaving the combustion chamber 110 travels to the aftertreatment apparatus 450 via the first exhaust channel 410. A proportion of exhaust gas leaving the combustion chamber 110 that is directed to the exhaust gas recirculation circuit 500 is determined by a degree to which the exhaust gas recirculation valve 510 is open.

Control of an extent to which the exhaust gas recirculation valve 510 is to be open may be based on a number of factors, including a desire to reduce a volume of NOx that arrives at the aftertreatment apparatus 450.

The degree to which the exhaust gas recirculation valve 510 is open is not the only variable that determines what proportion of exhaust gas will travel in each of the two channels 410, 420. Another significant determining variable is the changing resistance to exhaust flow in the aftertreatment apparatus as the aftertreatment apparatus becomes increasingly clogged. This may be particularly problematic with life of the aftertreatment apparatus in respect of deposits that are not successfully removed by regular cleaning cycles of the aftertreatment apparatus.

Figure 2:
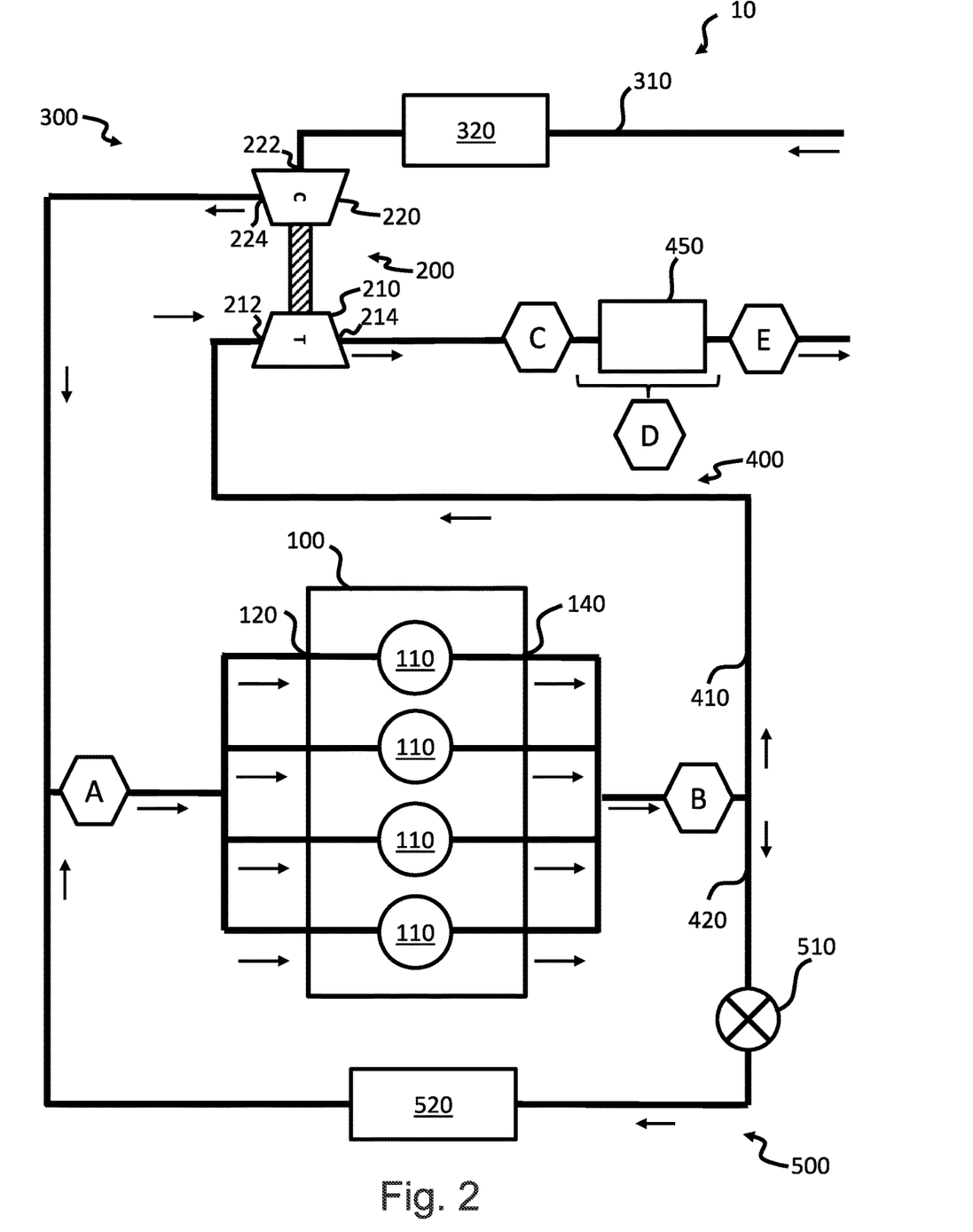
FIG. 2 shows the engine assembly of claim 1 on which are shown five locations where pressure and/or pressure values determine boundary conditions for exhaust behaviour between the aftertreatment apparatus and the exhaust gas recirculation circuit.

FIG. 2 shows the engine assembly 10 of FIG. 1 on which are shown five locations (A, B, C, D and E) within the engine assembly 10 at which the temperature and/or the pressure provides a boundary condition for how the degree of opening of the exhaust gas recirculation valve will influence the proportion of mass flowing in the aftertreatment apparatus.

Location A is the combustion chamber inlet 120 and the boundary conditions are pressure and temperature. Location B is the combustion chamber outlet 140 and the boundary conditions are pressure and temperature. Location C is an inlet of the aftertreatment apparatus 140 and the boundary conditions are pressure and temperature. Location D is the aftertreatment apparatus 450 and the boundary condition is pressure delta across the aftertreatment apparatus 450. Location E an outlet of the aftertreatment apparatus 450 where residual gas is released to atmosphere and the boundary condition is atmospheric pressure.

In simple engine assemblies, the number and locations of sensors may be limited. It may be that there are so few sensors that no form of closed loop feedback control is possible.

The present disclosure may enable compensation in exhaust gas recirculation valve position control to be made to a baseline instruction for the extent to which an EGR valve position is open in order to account for increased delta pressure across the aftertreatment apparatus by determining only a pressure drop across the aftertreatment apparatus and using pressure drop values determined over operating time to infer a constituent element of the pressure drop across the aftertreatment apparatus that may be attributed to age of the aftertreatment system (rather than attributable to instantaneous operating conditions). In this way, it is possible to provide compensation for the flow restriction in the aftertreatment system attributed to age of the aftertreatment system so as to maintain the proportion of exhaust gas recirculation even when flow restriction in the aftertreatment system increases due, for example, to age related ash deposits.

In one embodiment, pressure sensors are provided at locations C and E. By sensing pressure at C and at E, it is possible to calculate the pressure delta across the aftertreatment system.

In another embodiment, a delta pressure sensor is provided at D in order to sense the delta pressure across the aftertreatment system.

Either way, the pressure delta across the aftertreatment system at a particular moment in time is determined. By determining the pressure delta across the aftertreatment system over a period of time, it is possible to infer what proportion of the pressure drop is due to long term effects (aging) as distinct from what may be attributable to current use.

For a particular engine assembly architecture, there is an approximate relationship between a baseline expected pressure delta across the aftertreatment system and the age of the aftertreatment system. An aftertreatment system may be considered to be "new" when the pressure delta across the aftertreatment system due to particles that cannot be cleaned using standard cleaning processes (e.g. ash fill) is a minimum expected delta pressure value. The aftertreatment system may be considered to be at "end of life" when the pressure delta across the aftertreatment system due to uncleanable contaminants (e.g. ash fill) is at a maximum allowable delta pressure value.

Figure 3:
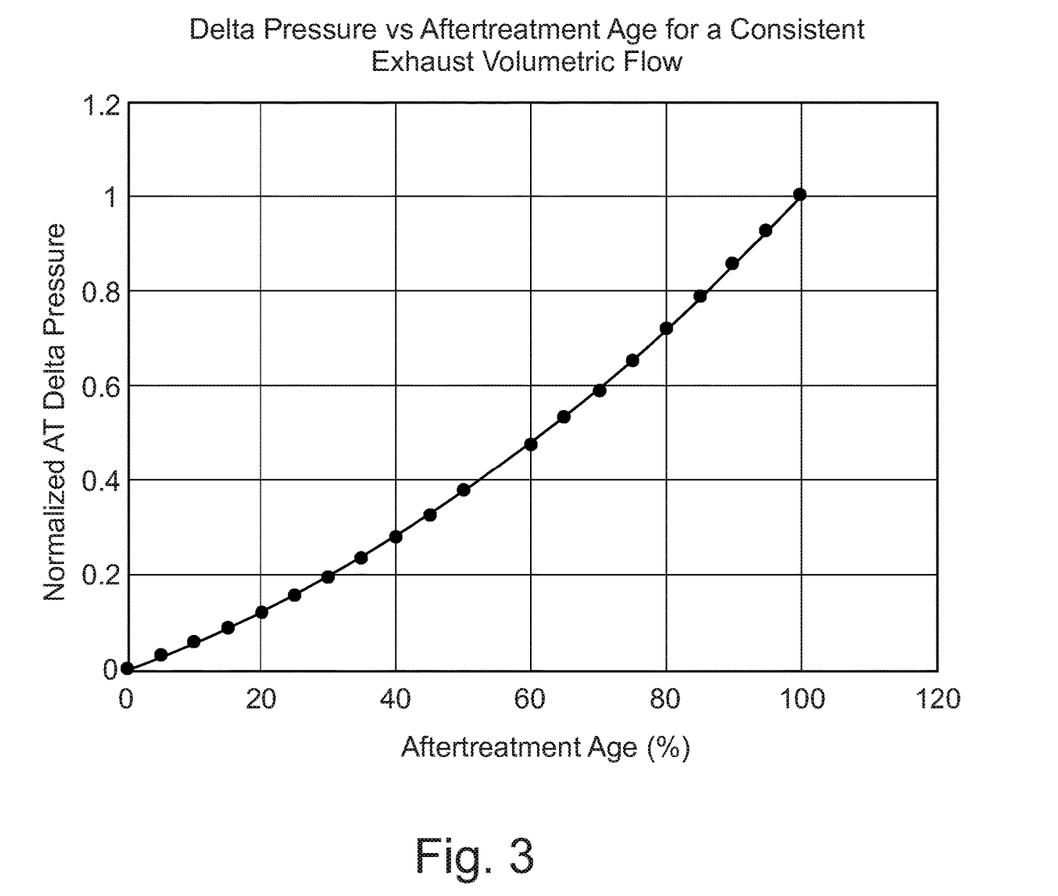
FIG. 3 shows a plot of aftertreatment normalized delta pressure against aftertreatment normalized age for a consistent volume flow.

As would be well understood by the skilled person, the actual measured pressure delta across the aftertreatment system depends on many variables in addition to uncleanable contaminants. Thus, the actual measured pressure delta across the aftertreatment system may fluctuate considerably depending on, for example, precise pressures and temperatures. Therefore, the relationship between the baseline expected pressure delta across the aftertreatment system and the "age" of the aftertreatment system is a trendline rather than a strict function. An example of a normalised trendline for expected pressure delta across the aftertreatment system and the age of the aftertreatment system is shown in FIG. 3.

Figure 4:
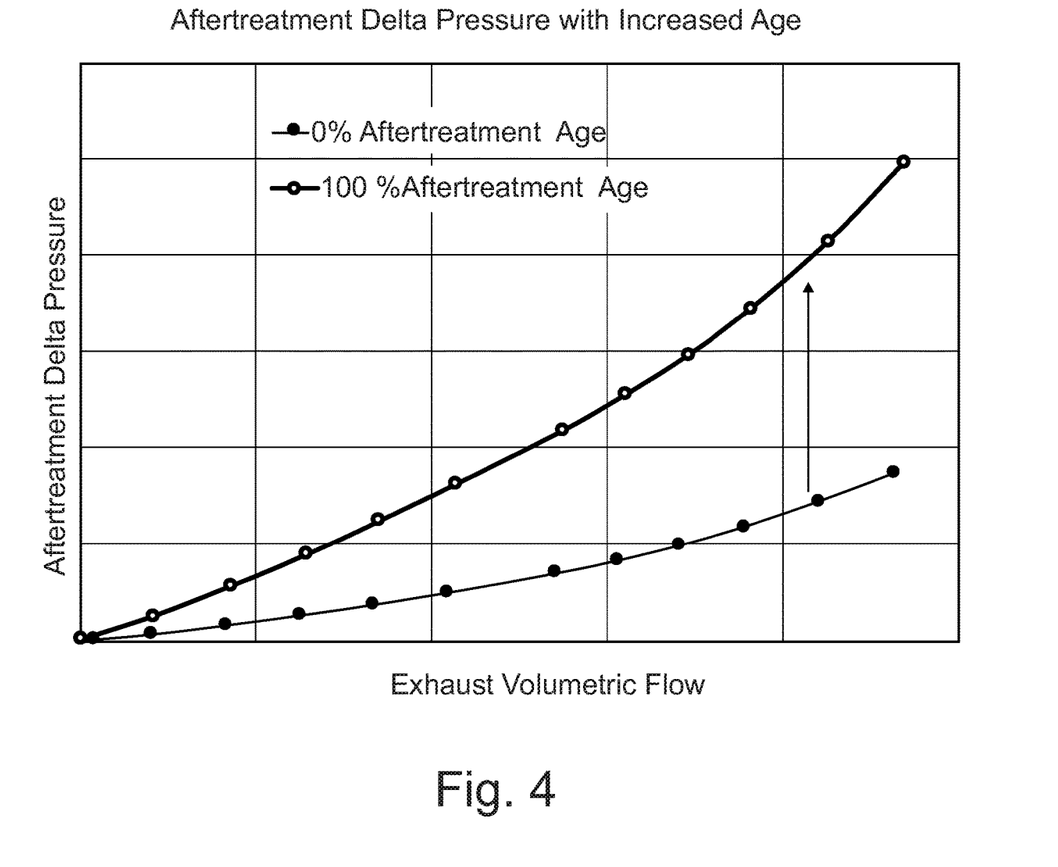
FIG. 4 shows aftertreatment delta pressure against exhaust volumetric flow for an aftertreatment system at 0% age and an aftertreatment apparatus at 100% age.

Expected pressure delta across the aftertreatment system varies also, among other factors, with the volumetric flow through the aftertreatment system. FIG. 4 shows normalised delta pressure across the aftertreatment system versus exhaust volumetric flow for both a "new" aftertreatment system and an "end of life" aftertreatment system. As is clear from the graph, the difference between the delta pressure curves for "new" and "end of life" aftertreatment systems is greatest when the volumetric flow is greatest. As such, when using aftertreatment delta pressure as part of a calculation by which to determine aftertreatment "age", it may be preferable to determine this using higher volumetric flow rates rather than lower volumetric flow rates. (This is in addition to steps taken to reflect the fact that the relationship between aftertreatment delta pressure and aftertreatment "age" is a trendline rather than a strict function.)

When an engine is cold, it is unlikely that there would be call for exhaust gas recirculation. Therefore, it would be expected that the exhaust gas recirculation valve would remain closed during a period following engine start up from cold. During this period, when the exhaust gas recirculation valve remains closed, mass flow through the aftertreatment system would be expected to be at its highest (compared with when the exhaust gas recirculation valve might be at least partly open once the engine is warm) and therefore-given that the delta pressure in the aftertreatment system is highest when volumetric flow through the aftertreatment system is highest (per FIG. 4)—it may be preferable to seek to maximise an extent to which aftertreatment ageing can be inferred when the engine is cold. Furthermore, at higher volumetric flow the effect of noise on pressure sensor readings may be lower.

The control system may provide a control map that maps aftertreatment "age" with a compensation function to be applied to an instruction for the extent to which the exhaust gas recirculation valve is to be opened. The compensation function will reduce the extent to which the exhaust gas recirculation valve is to be open with age of the aftertreatment system. In this way, as the delta pressure across the aftertreatment system increases with age, the exhaust gas recirculation valve closes a corresponding amount, such that the percentage flow of exhaust gas in the exhaust gas recirculation circuit remains constant even as the delta pressure in the aftertreatment system increases with age.

As would be well understood by the skilled person, care is required with the precise implementation. Aftertreatment aging is a slow and gradual process. By contrast, pressure, temperature and mass flow can vary rapidly and considerably. Therefore, a degree of filtering is required in order not to infer ageing from other variables. A heavy filter may therefore be applied in order that the compensation is more consistent and robustly applied.

Furthermore, different filtering or control maps may be required for use following initial engine start up (e.g. before the system reaches steady state temperature) and during aftertreatment cleaning (regeneration) processes. This is because the differing temperature and pressure profiles during these periods of operation might otherwise result in incorrect inferences regarding compensation required due to ageing of the aftertreatment system.

Figure 5:
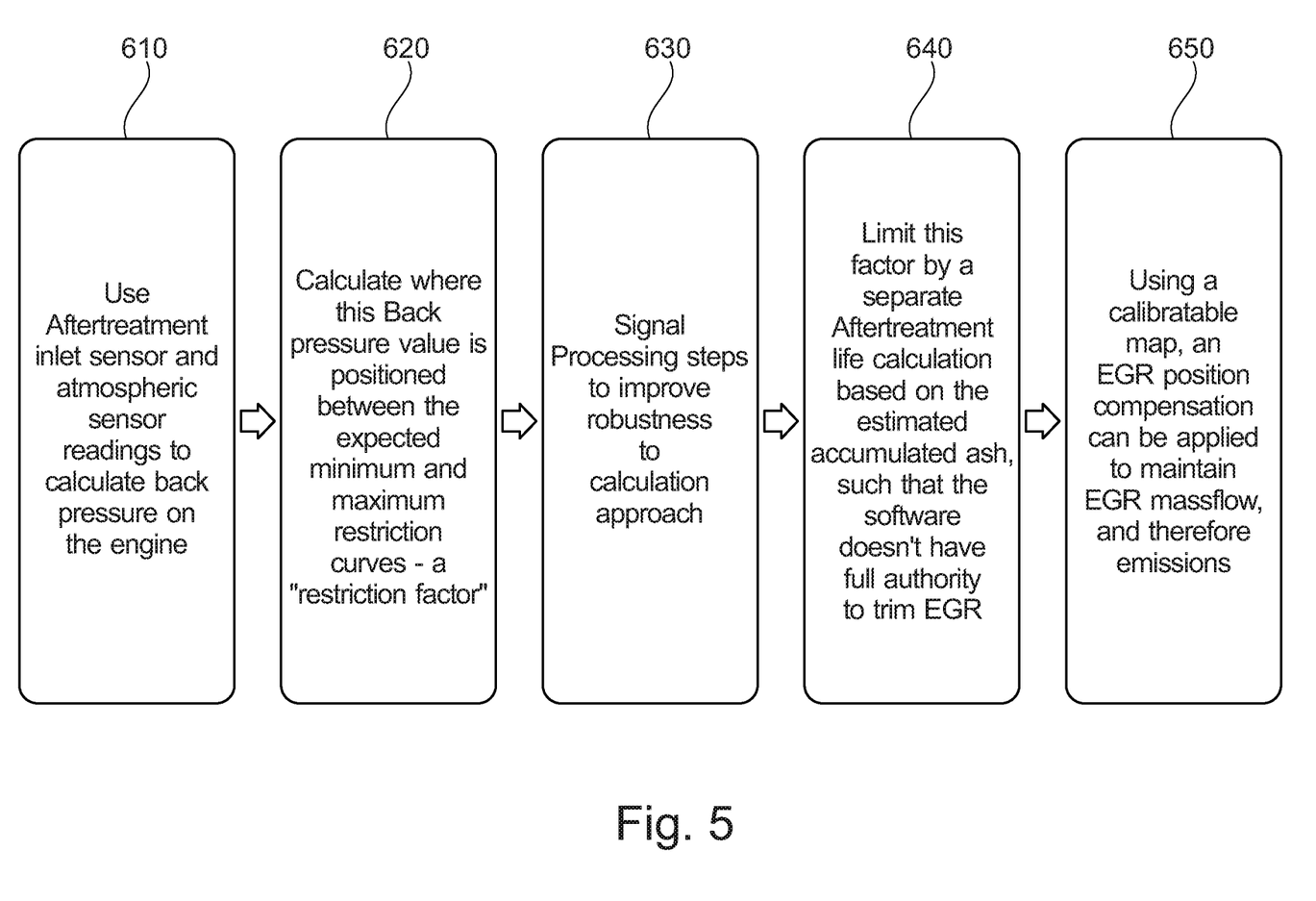
FIG. 5 shows a highly conceptual process flow in accordance with the disclosure.
Figure 6:
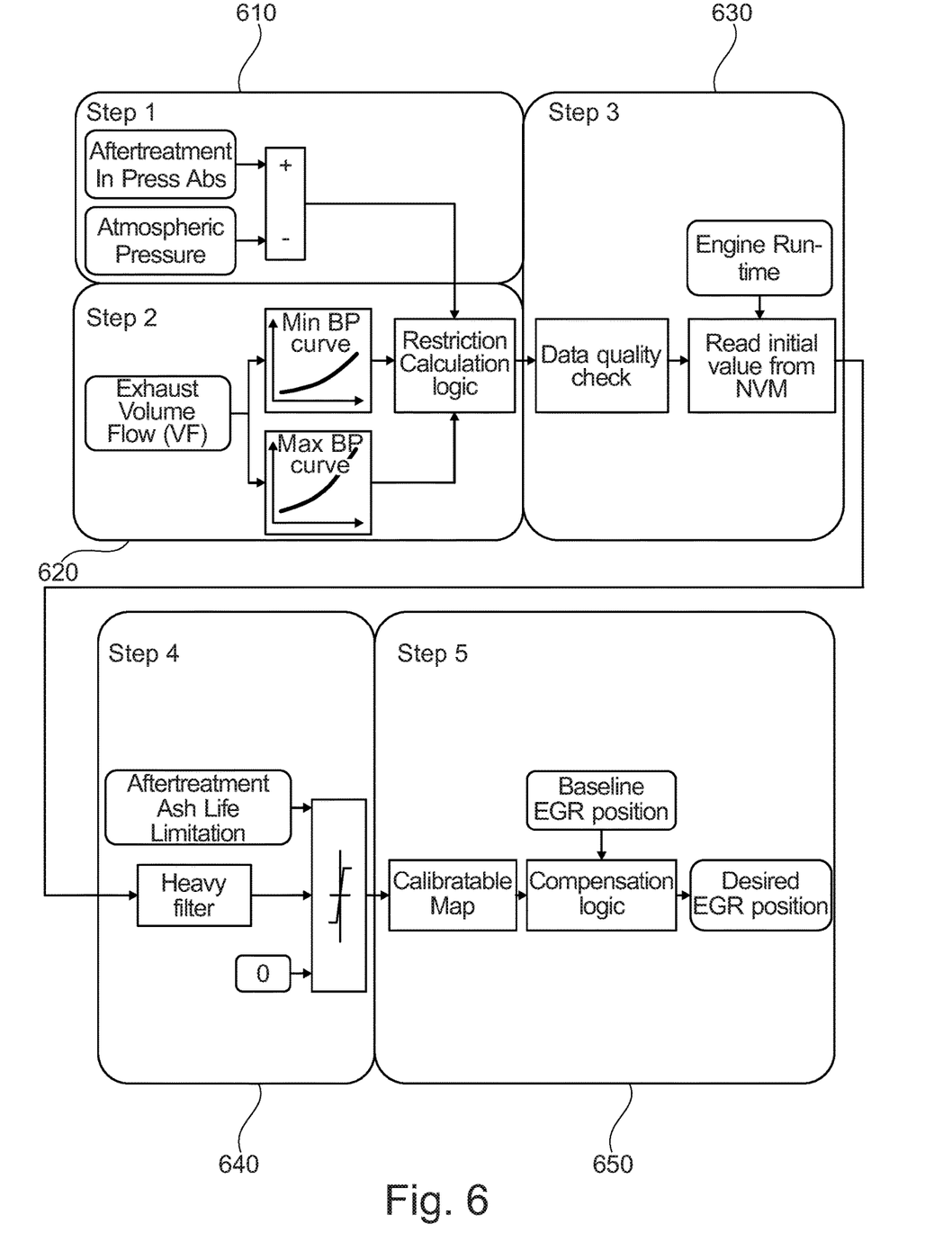
FIG. 6 shows a more detailed explanation of a process flow in accordance with the disclosure.

FIG. 5 shows a high level implementation of an embodiment of the disclosure for an engine having pressure sensors at locations C and E per FIG. 2. FIG. 6 shows a more granular implementation of the FIG. 5 approach.

At step 610, pressure readings are taken from locations C and E and a delta pressure value across the aftertreatment system is thereby calculated.

At step 620, the delta pressure value is compared with an expected minimum ("new") and an expected maximum ("end of life") in order to determine a restriction factor.

At step 630, signal processing steps are undertaken to improve the robustness of the restriction factor calculation approach adopted at step 620. A check may be made with the number of hours of engine operation.

At step 640, a compensation factor is obtained. First, heavy filtering is performed in order to seek to minimise the impact of short term fluctuations on the delta pressure. Secondly, the heavy filtering result is compared with both the expected values for the aftertreatment system when "new" and when at "end of life". This further mitigates impact of the compensation when it is unlikely that an inferred value for increased flow restriction is attributable to age based factors. The output of the step 640 is the compensation factor.

At step 650, the compensation factor is used to interrogate a calibration map in order to obtain an EGR compensation value to be applied. It is the EGR compensation value that is used to amend a baseline instruction that may be obtained from a control map for the extent to which an EGR valve position is open (as would be appropriate in an event that the aftertreatment system is new) in order to compensate for age related flow restriction in the aftertreatment system. The calibration map may, in fact, provide the compensation value embedded within a modified EGR position instruction rather than providing a separate compensation value to be applied to the baseline EGR instruction value obtained from the control map.

It should be noted that the term determine should be understood to obtain by any appropriate approach. Thus, determination may be achieved by calculation. Determination may be achieved by consulting a control map, a calibration map, a look up table or similar. Determination may involve any combination of the above.

The term compensation function should be understood to define any functional relationship.

The compensation function may comprise a compensation factor. The compensation factor may be an offset.

What is claimed is:

1. An engine assembly comprising:
    an internal combustion engine having: a combustion chamber with a combustion chamber inlet for supplying air to the combustion chamber and a combustion chamber outlet for releasing exhaust gas from the combustion chamber;
    an exhaust channel arrangement configured to receive exhaust from the combustion chamber outlet and to supply exhaust to a first exhaust channel and a second exhaust channel;
    an exhaust aftertreatment apparatus configured to receive exhaust from the first exhaust channel;
    an exhaust gas recirculation circuit configured to receive exhaust gas from the second exhaust channel and to supply exhaust gas to the combustion chamber inlet for supplying recirculated exhaust gas to the combustion chamber, wherein the exhaust gas recirculation circuit comprises an exhaust gas recirculation valve for regulating flow of exhaust through the exhaust gas recirculation circuit; and
    a controller configured:
        to determine a desired proportion of exhaust gas to be directed to the exhaust gas recirculation circuit;
        to determine, based on the proportion of exhaust gas to be directed to the exhaust gas recirculation circuit, a baseline value for an extent to which to open the exhaust gas recirculation valve for a clean aftertreatment apparatus;
        to determine an age of the exhaust aftertreatment apparatus;
        to determine an inferred aftertreatment flow restriction value based on a pressure drop across the exhaust aftertreatment apparatus and the age of the exhaust aftertreatment apparatus;
        to determine a compensation function based on the inferred aftertreatment flow restriction value; and
        to control an extent to which the exhaust gas recirculation valve is open based on the baseline value modified by the compensation function in order to maintain the desired proportion of exhaust gas to be directed to the exhaust gas recirculation circuit.

2. The engine assembly of claim 1 wherein the controller is configured to determine the desired proportion of exhaust gas to be directed to the exhaust gas recirculation circuit by obtaining an EGR ratio from a control map.

3. The engine assembly of claim 1 wherein the controller is configured to determine the compensation function based on an inferred aftertreatment flow restriction value by calculating a compensation factor and using the compensation factor to obtain a compensation value from a calibration map.

4. The engine assembly of claim 1 wherein the engine assembly comprises one or more sensors configured to provide values by which a pressure differential value across the aftertreatment apparatus is obtained.

5. The engine assembly of claim 4 wherein the pressure differential value is a variable in the determination of the compensation function.

6. The engine assembly of claim 1 wherein the inferred aftertreatment flow restriction value is filtered to remove short term flow restriction impacts.

7. The engine assembly of claim 1 wherein the aftertreatment apparatus comprises a diesel particulate filter.

8. A method of controlling an engine assembly comprising:
    an internal combustion engine having: a combustion chamber with a combustion chamber inlet for supplying air to the combustion chamber and a combustion chamber outlet for releasing exhaust gas from the combustion chamber;
    an exhaust channel arrangement configured to receive exhaust from the combustion chamber outlet and to supply exhaust to a first exhaust channel and a second exhaust channel;
    an exhaust aftertreatment apparatus configured to receive exhaust from the first exhaust channel; and
    an exhaust gas recirculation circuit configured to receive exhaust gas from the second exhaust channel and to supply exhaust gas to the combustion chamber inlet for supplying recirculated exhaust gas to the combustion chamber, wherein the exhaust gas recirculation circuit comprises an exhaust gas recirculation valve for regulating flow of exhaust through the exhaust gas recirculation circuit;
    wherein the method comprises:
        determining a desired proportion of exhaust gas to be directed to the exhaust gas recirculation circuit;
        determining, based on the proportion of exhaust gas to be directed to the exhaust gas recirculation circuit, a baseline value for an extent to which to open the exhaust gas recirculation valve for a clean aftertreatment apparatus;
        determining an age of the exhaust aftertreatment apparatus;
        determining an inferred aftertreatment flow restriction value based on a pressure drop across the exhaust aftertreatment apparatus and the age of the exhaust aftertreatment apparatus;
        determining a compensation function based on the inferred aftertreatment flow restriction value; and
        controlling an extent to which the exhaust gas recirculation valve is open based on the baseline value modified by the compensation function in order to maintain the desired proportion of exhaust gas to be directed to the exhaust gas recirculation circuit.

9. The method of claim 8 wherein determining the desired proportion of exhaust gas to be directed to the exhaust gas recirculation circuit comprises obtaining an EGR ratio from a control map.

10. The method of claim 8 wherein determining the compensation function based on an inferred aftertreatment flow restriction value comprises calculating a compensation factor and using the compensation factor to obtain a compensation value from a calibration map.

11. The method of claim 8 further comprising determining a pressure differential value across the aftertreatment apparatus using one or more pressure sensors.

12. The method of claim 11 wherein the pressure differential value is a variable in the determination of the compensation function.

13. The method of claim 8 further comprising filtering the inferred aftertreatment flow restriction value to remove short term flow restriction impacts.

14. The method of claim 8 wherein the engine assembly comprises a diesel particulate filter.

* * * * *